No. 829,521. PATENTED AUG. 28, 1906.
E. A. GILES.
DELIVERY TANK FOR LIQUIDS.
APPLICATION FILED MAR. 13, 1905.
3 SHEETS—SHEET 1.
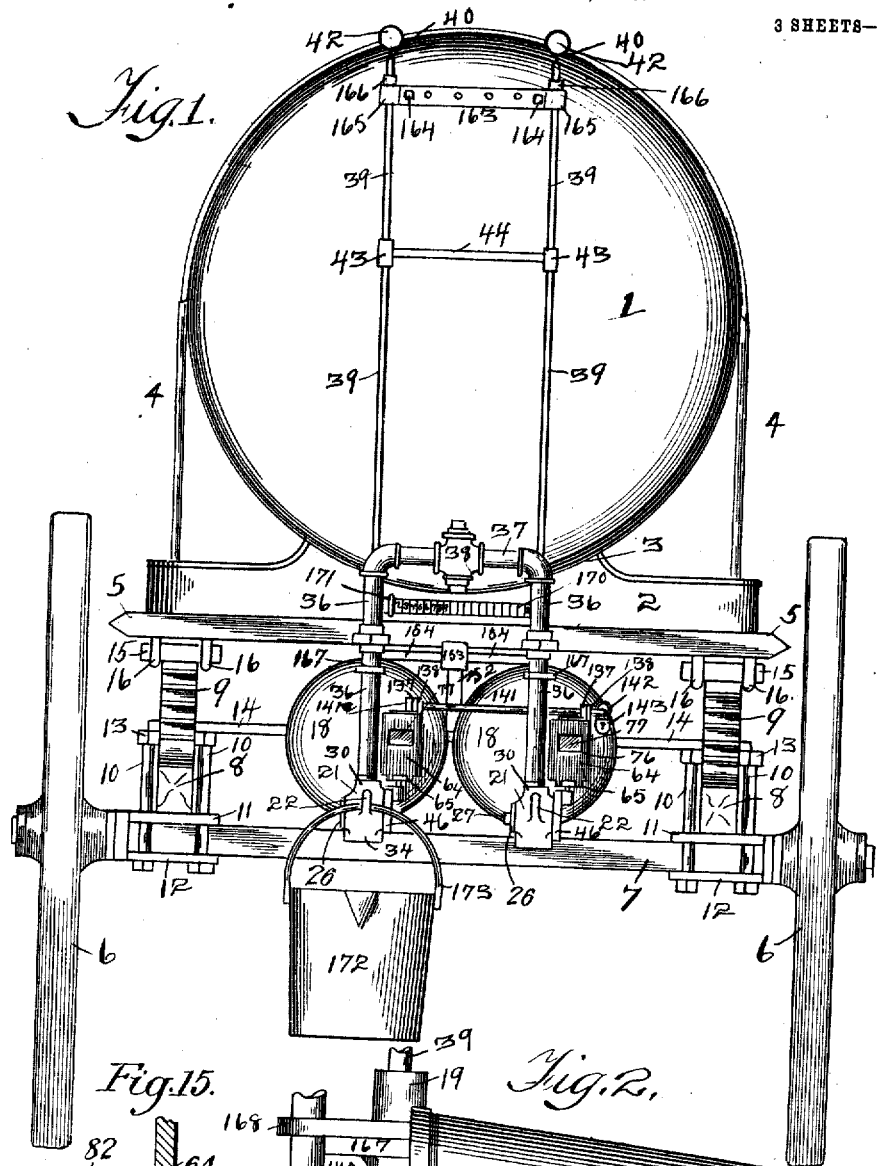
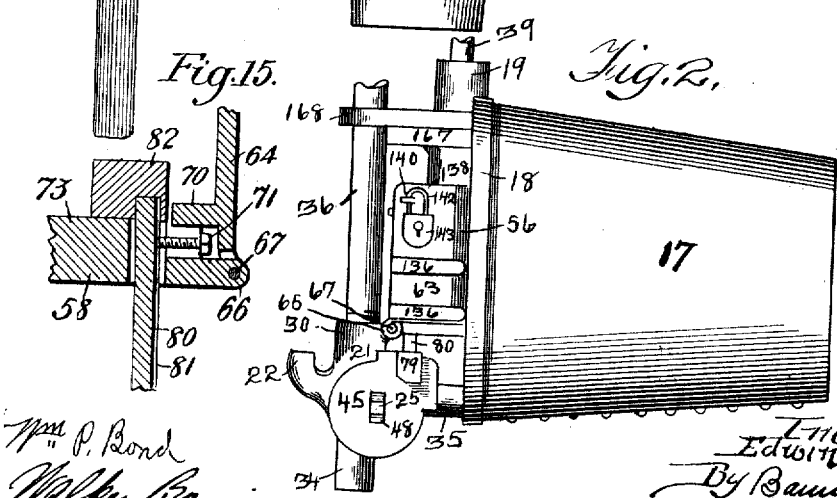

No. 829,521.
PATENTED AUG. 28, 1906.
E. A. GILES.
DELIVERY TANK FOR LIQUIDS.
APPLICATION FILED MAR. 13, 1905.
3 SHEETS—SHEET 2.
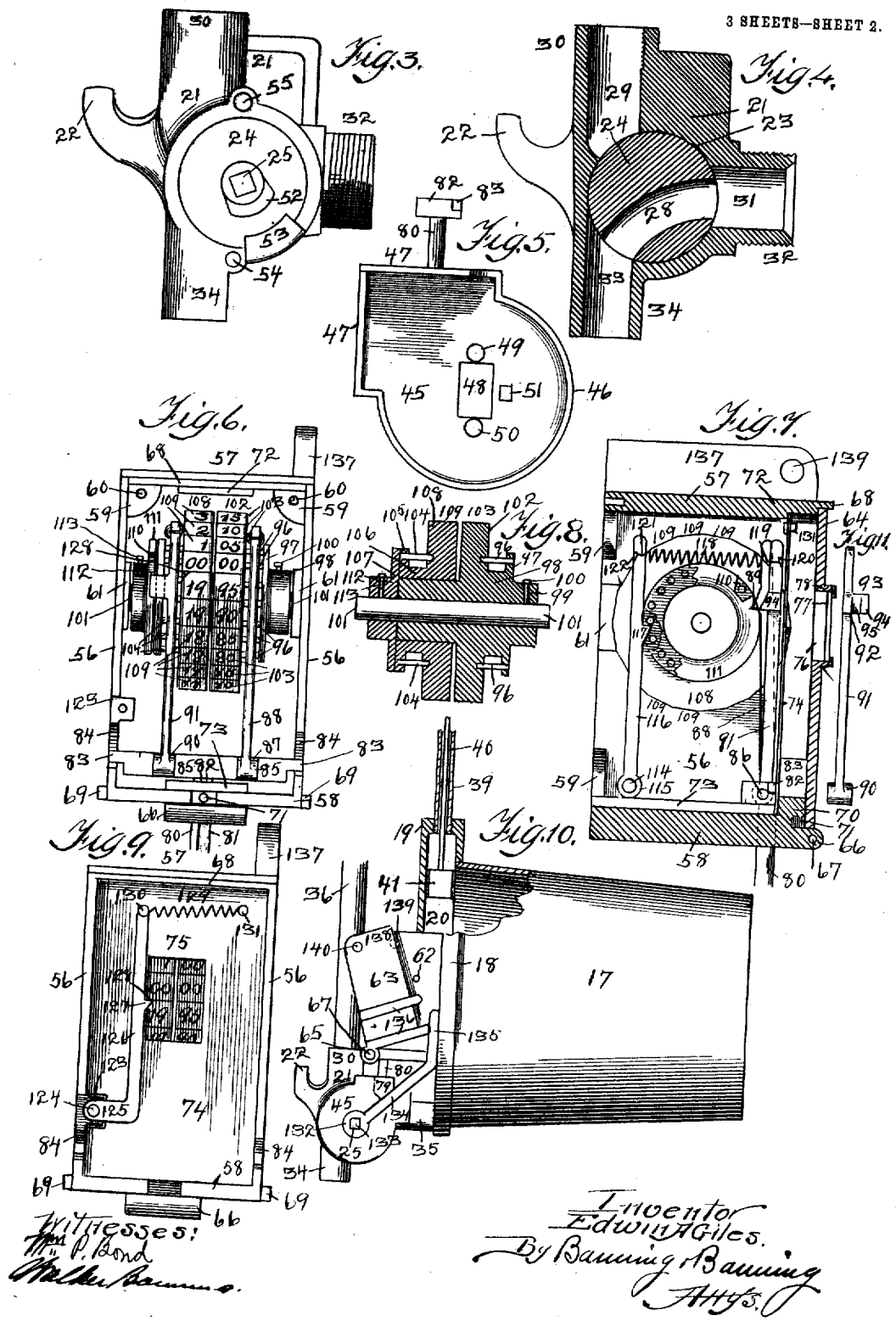
Witnesses:
Wm. P. Bond
Walker Banning
Inventor
Edwin A. Giles.
By Banning & Banning
Attys.

No. 829,521. PATENTED AUG. 28, 1906.
E. A. GILES.
DELIVERY TANK FOR LIQUIDS.
APPLICATION FILED MAR. 13, 1906.
3 SHEETS—SHEET 3.
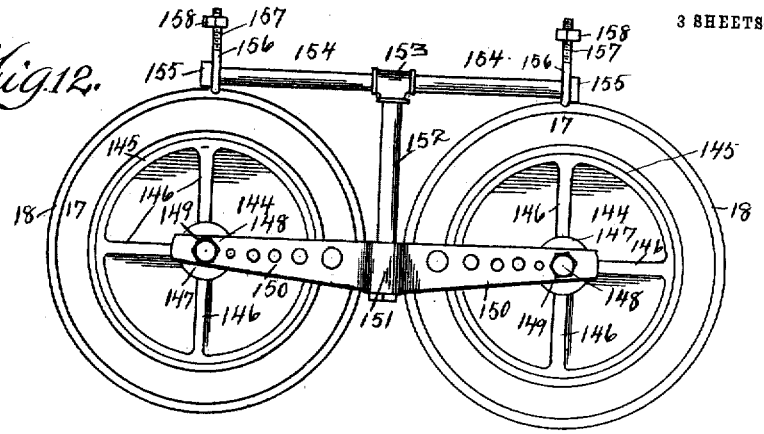
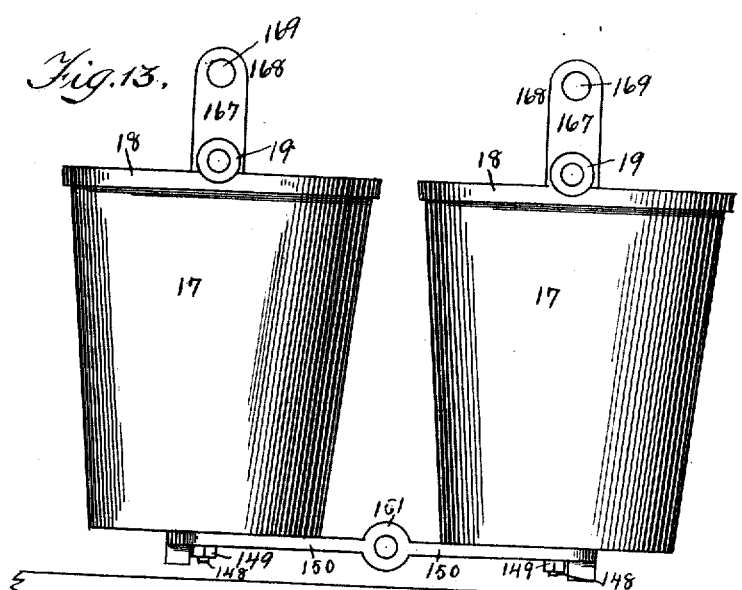
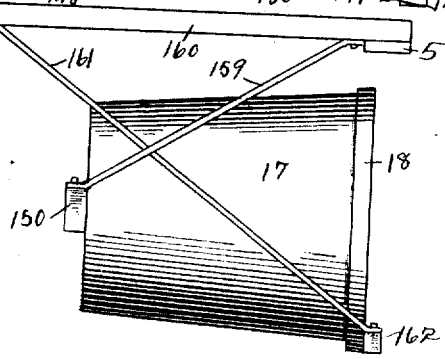
Witnesses:
Wm. P. Bond
Walker Banning
Inventor
Edwin A Giles.
By Banning & Banning
Attys.

UNITED STATES PATENT OFFICE.

EDWIN A. GILES, OF CHICAGO, ILLINOIS.

DELIVERY-TANK FOR LIQUIDS.

No. 829,521.   Specification of Letters Patent.   Patented Aug. 28, 1906.

Application filed March 13, 1905. Serial No. 249,911.

*To all whom it may concern:*

Be it known that I, EDWIN A. GILES, a citizen of the United States, residing at Chicago, in the county of Cook and State of Illinois, have invented certain new and useful Improvements in Delivery-Tanks for Liquids, of which the following is a specification.

This invention relates to delivery-tanks for liquids specially adapted for use in distributing in measured quantities oil or other liquid.

The objects of the invention are to furnish the liquid-delivery tank with a measuring vessel adapted to contain a measured quantity or given amount of liquid when full and have the supply of liquid to the measuring vessel and the discharge of the liquid therefrom controlled by a faucet, the valve of which operates a register with each filling and discharge of the liquid; to furnish a measuring vessel for containing when full a measured quantity or given amount of liquid and having the induction and eduction of the liquid controlled by a valve which operates a registering mechanism with each filling and emptying of the vessel, thereby indicating the amount of liquid withdrawn from the tank and delivered; in locating the measuring vessels underneath the frame of the tank-wagon and in such relation as to be protected against injury from being struck by a vehicle or otherwise; to provide a measuring vessel of a cylindrical tapered formation with the end of the greatest diameter outward; to control the induction and eduction of liquid into and out from the measuring vessel by a valve having a plug with a single passage therein, which with the turning of the plug furnishes communication for inducting liquid into the measuring vessel and for educting liquid from the measuring vesssel and locating on the stem of the valve-plug a cam which engages with a movable plate having connection with registering-wheels, so that the turning of the plug to induct and educt the liquid will advance the registering-wheel one step or notch at each filling and emptying of the measuring vessel; to locate a cam on the stem of the plug of the controlling-valve for the measuring vessel and have the cam engage the pins on a movable plate for reciprocating the plate with each turning of the valve to supply liquid to and discharge liquid from the measuring vessel; to furnish a reciprocating plate actuated by the turning of the controlling-valve for the measuring vessel, which plate is connected with a movable bar carrying pawls or dogs arranged to advance registering-wheels for indicating the amount of liquid withdrawn from the main supply-tank; to construct a fixed casing having a movable front or cover and inclosing registering-wheels and pawls or dogs for operating the registering-wheels; to locate in a casing attached to the outer end of the measuring vessel a slidable bar actuated from the turning of the controlling-valve for the liquid inducted into and educted from the measuring vessel, which bar has connected therewith and operated therefrom a pawl for a units-wheel and a pawl for a hundreds-wheel, with the pawls moved to engaging position with the turning of the valve to supply liquid and with the turning of the valve to discharge liquid from the measuring vessel, for the pawls advance the registering-wheels one step or number, it being understood that the hundreds-wheel is not advanced until one complete revolution of the units or tens wheel has been made; to construct a casing for the reception of a registering mechanism, said casing comprising a body portion adapted for attachment to the end of the measuring vessel and a cover or front having overlapping sides, with the body and front provided with flanges or ears for the passage of a locking-bar which receives a lock, whereby the casing can be locked against tampering with the registering mechanism therein except by the party having the key for the lock; to construct registering-wheels for tens and hundreds, each wheel having a periphery with flat faces, on which faces are numbers consecutively advanced and each wheel having engaging pins, with which a reciprocating pawl or dog operates to advance the wheel and with which locking-pawls engage to prevent any backward movement of the wheels; in locating a cross-plate within the casing containing the registering mechanism, which plate and the front or cover of the casing have therein sight-openings for inspecting the registering-wheels; to furnish a stop dog or pawl which prevents any advance of the registering-wheels after both wheels have completed their full revolutions and reach the zero, thereby preventing any false registration by advancing the wheels after the oil in the tank has been all withdrawn; to prevent tampering with the registering mechanism after the tank has been returned to the supply-depot by attaching a guard over the end of the stem for the plug of the valve, which prevents the entering of the turn-key to operate the plug; to support the measuring vessels and the registering mechanism attached thereto in a firm and substantial manner, and to improve generally the construction and operation of the several parts and elements entering into the formation of the measuring vessels, the registering devices, and the support for the measuring vessels.

The invention consists in the features of construction and combinations of parts hereinafter described and claimed.

In the drawings, Figure 1 is an end elevation of a tank and the rear wheels of the wagon, showing two measuring vessels and their connecting devices in position; Fig. 2, a side elevation of a measuring vessel with the registering mechanism attached thereto; Fig. 3, a side elevation of the faucet and the controlling-valve for inducting liquid into and educting liquid from the measuring vessel; Fig. 4, a sectional elevation of the device shown in Fig. 3; Fig. 5, an inner face view of the movable plate actuated from the turning of the plug of the controlling-valve; Fig. 6, a front elevation of the main casing with the cover removed, showing the registering-wheels and the pawls for advancing the wheels; Fig. 7, a central vertical section through the casing and front or cover, showing the registering-wheel for the hundreds partly broken out and showing the actuating-pawl and the stop-pawl; Fig. 8, a detail in section of the registering-wheels and the supporting-shaft therefor with the shaft in elevation; Fig. 9, a front elevation of the main casing and showing the guard-plate or partition in place and showing also the lock or dog for preventing rotation after both registering-wheels have completed their full revolution; Fig. 10, a side elevation of a controlling vessel, partly broken away at the upper front corner to show the float controlling the vent and with the cover or front for the casing of the registering mechanism partly open and showing the locking-bar in position to prevent the turning of the plug of the controlling-valve; Fig. 11, an edge elevation of the pawl for operating the hundreds-wheel; Fig. 12, an end elevation of the rear of the measuring vessels, showing the support therefor; Fig. 13, a top or plan view of the measuring vessels; Fig. 14, a side elevation of the measuring vessel, showing the front and rear side support or bracing therefor; and Fig. 15, a detail in section, showing the connection between the rod of the movable plate and the cross-bar carrying the actuating-pawls.

The tank 1 can be of the usual construction of tanks for distributing oil or other liquid. This tank is supported on a wagon body or frame in any usual and well-known manner, and, as shown, its rear end is supported on a bolster 2, having a central depression or concave 3, into which the under side of the tank enters, and the tank is held in position by stay-rods 4, entered into the side bars or beams of the wagon-body, as usual. The bolster 2 rests on a cross-bar 5 in the arrangement shown. The rear carrying-wheels 6 are shown, and these wheels run on spindles at the ends of the rear axle 7, as usual. A block or support 8 has secured thereto a leaf-spring 9 by means of bolts 10, plates 11 and 12, and plate 13, forming a clip with the plate 13, connected by a cross plate or stiffening-rod 14, which may be formed with the clip-plates 13 or otherwise. The ends of the leaf-spring are connected by cross-pins or pivots 15 and eyebolts 16 with the framework of the wagon. The parts so far described can be of any usual and well-known form of construction and arrangement for tank-wagons.

The measuring vessels, two being used in the arrangement shown, are each constructed with a body or shell 17 of a tapered formation. The front end of the body or shell 17 is attached by rivets or otherwise to a head 18, and this head has formed therewith or attached thereto a wall 19, in which is a chamber 20, having open communication with the interior of the measuring vessel, as shown in Fig. 10. A shell or casing 21 has on its forward side a hook 22 for the reception of the bail of a carrying bucket or pail. The shell or wall 21 has therein a hole 23, which receives the valve-plug 24 of the controlling-valve, and this plug 24 at one end has a stem 25 with a squared end for the reception of a turn-key or wrench by which the plug can be turned, as required, to supply liquid to the measuring vessel or discharge liquid from the measuring vessel. The plug is held in place within the casing or wall by means of a washer 26 and nut 27 at its opposite end, as shown in Fig. 1. The plug 24 of the controlling-valve has therein a single passage 28 on a curve, which passage can be brought into alinement with a passage 29 in the wall 30 on the main casing or wall of the valve and also in line with a passage 31 in a nipple 32, having an exterior screw-thread for attachment to the head 18 of the measuring vessels, so that when the passages 28 and 29 and 31 are in communication oil or liquid can flow from the tank into the measuring vessel to fill the vessel. The passage 28 can also be brought into communication with a passage 33 in a discharge-nozzle 34 on the main shell or wall of the valve, so that when the passages 28, 31, and 33 are in communication, as shown in Fig. 4, oil can flow from the measuring vessel into the receiving bucket or pail suspended from the hook 22 with the oil closed against entering the measuring vessel through the passage 29, as shown in Fig. 4.

The nipple 32 is threaded into the end of a pipe 35, which enters the head 18 of the measuring vessel at the lower point, so that all of the oil contained in the measuring vessel can flow out therefrom.

A supply-pipe 36 is entered into the wall or nipple 30, and this pipe is connected to a cross-pipe 37, having therein a three-way valve 38, which is connected by a pipe with the rear head of the tank and can be any well-known form of three-way valve or cock, so that by turning the plug of the valve 38 in proper position oil can flow through the cross-pipe or header 37 in both directions into both of the supply-pipes 36 to simultaneously supply oil to both measuring vessels, or the plug of the valve 38 can be turned so as to supply oil through one side of the cross-pipe or header 37 only and into one supply-pipe 36 for oil to enter one of the measuring vessels only.

A tube 39 is entered into the upper end of the wall 19, and this tube has located therein a rod 40, the lower end of which is attached to a float 41 in the chamber 20, which float is free to rise and fall within the chamber 20, the float rising with the admission of oil or liquid into the vessel 17 and falling with the discharge of oil and liquid from the vessel 17, so that the filling of the vessel 17 with the oil or liquid vents the air through the tube 40 and the discharge of oil from the vessel 17 admits air through the tube 40, thus insuring proper pressure within the vessel 17 in supplying liquid thereto and discharging liquid therefrom. Each measuring vessel is supplied with a vent-tube 39, and each vent-tube contains a rod 40. Each rod 40 has at its upper end a ball 42, which by its rising and falling movement indicates the condition of the measuring vessel as regards the supply of oil and liquid thereto or the discharge of oil or liquid therefrom. As shown, each tube 39 is made in sections connected by suitable couplings 43, and one set of couplings, as shown, has a cross-rod 44 for giving rigidity and stiffness to the tubes; but, if desired, this cross-rod 44 can be omitted.

A plate 45, having on one side an annular or circular rim 46 and on the opposite side a rectangular or straight rim 47, is located on the exterior of the casing or body 21 of the controlling-valve. This plate 45 has therein a slot 48 for the passage of the stem 25 of the plug of the controlling-valve, and at one end of the slot 48 is a pin 49, and at the other end of the slot 48 is a pin 50. At one side of the slot 48 is a fixed lug or stop 51, which prevents side play of the plate 45 without interfering with the free vertical rising and falling of said plate.

A cam 52 is formed with or fixedly secured to the stem 25 of the plug 24 of the controlling-valve, and this cam 52 is arranged for its face to engage the pins 49 and 50 while the face of the stem 25 is in engagement with the face of the lug 51, so that by turning the plug 24 the cam 52 will engage the pin 49 and raise the plate 45 or will engage the pin 50 and depress or lower the plate 45, according as the plug is turned to admit or induct oil or liquid into the measuring vessel or to discharge or educt oil or liquid from the measuring vessel, the turning of the plug 24 to induct oil into the measuring vessel causing the cam 52 to engage the pin 49 and raise the plate 45 and the turning of the plug 24 to educt oil from the measuring vessel, causing the cam 52 to engage the pin 50 and lower or depress the plate 45, thus insuring the movement of the plate coincident with the turning of the controlling-plug for inducting and educting oil or liquid from the measuring vessel.

The end of the plug 24 of the controlling-valve has fixed thereto a stop 53, the ends of which strike a bottom lug or pin 54 or a top lug or pin 55 on the side of the main shell of the valve and limit the turning of the plug in either direction, so as to insure the proper registering of the passage 28 with the passages 29 and 31 and with the passages 31 and 33 for inducting oil into the measuring vessel or educting oil from the measuring vessel.

A casing is attached to the head 18 of each measuring vessel. This casing has side walls 56, a top wall 57, and a bottom wall 58 in the construction shown, and, as shown, at the rear side of the casing in each corner are ears 59, each having a screw-hole 60 for the passage of screws or bolts by which the casing can be secured to the end 18 of the measuring vessel. Each side wall 56, as shown, has inwardly-projecting flanges 61, and, as shown, through each flange and the side wall is a hole 62 for the reception of the shaft on which the registering-wheels are mounted.

A cover for the main casing, as shown, is formed of side plates or walls 63 and a front plate or wall 64, and the front plate or wall at its lower edge or end has thereon ears 65, which receive between them an ear 66 on the bottom wall 58 of the main casing, through which ears 65 and 66 a pivot or pin 67 passes, holding the front or cover to the main casing.

The top wall 57 of the main casing is undercut to form a shoulder 68, against which the inner face of the front wall 64 abuts when the cover is closed, as shown in Fig. 7, and, as shown, at the lower end of each side wall 56 is a lug 69, which takes into a recess in the side wall 63 of the cover, so as to interlock the side wall of the cover with the main shell or casing and prevent detachment or displacement of the cover by withdrawing the pivot-pin of the hinge.

The inner face of the front 64 of the cover at its lower end has inwardly-projecting therefrom a flange 70, as shown in Fig. 15, which extends over an opening in the bottom wall 58, in which opening is the head of a set-screw 71, the stem of which threads through the bottom wall 58 for its end to engage a slot in the connecting-rod from the rising and falling plate 45, so as to prevent the connecting-rod from turning when once adjusted.

The top wall 57 has a flange 72, and the bottom wall 58 has a flange 73, the flanges 72 and 73 terminating rearwardly of the front edge of the side walls 56 of the main casing, and against the terminal end faces of the flanges 72 and 73 a cross-plate 74 abuts, which plate has therein a sight-opening 75 for inspection of the faces of the registering-wheels, and this sight-opening 75 is in line with a sight-opening 76 in the front wall 64 of the cover, which sight-opening 76 is protected by a plate 77, of glass or other transparent material, held in place by a ring 78 or otherwise entered into a recess in the front plates 64, in which the window of the sight-opening 76 is located, thus permitting the inspection of the registering-wheels and preventing access to the wheels unless the glass or transparent material is broken.

The plate 45 has at its upper end on one side a lug 79, into which is threaded or otherwise entered the lower end of a rod or stem 80, which passes through the bottom wall 58 of the main shell or casing and has therein a slot 81 for engagement with the end of the set-screw 71, so as to hold the stem or rod against being turned after once adjusted.

The upper end of the stem or rod 80 is entered into a cross-bar 82, having at each end a guide 83, which enters slots 84, formed in the side walls 56 of the main shell or casing, so that the cross-bar is free to be raised and lowered and at the same time is maintained by the guide end 83 and the slots 84 in a straight-line movement in rising and falling. The cross-bar 82 is raised and lowered by the rising and falling movement of the plate 45 through the action of the cam 52 and the pins 49 and 50, as already described. The cross-bar 82 has therein slots or recesses 85, crossing each of which is a pin or rod 86, carried by the cross-bar, as shown in Figs. 6 and 7. The head or socket 87 of a pawl 88 is mounted pivotally on the rod or wire 86 in one of the slots or openings 85, and the body or stem of the pawl 88 extends upwardly, and its rear edge near the top has a catch or point 89 to engage the units or tens wheel and advance such wheel a single space or number at each complete rising and falling movement of the bar 82 from the turning of the plug 24 of the controlling-valve in supplying liquid to and discharging liquid from the measuring vessel. The other slot or recess 85 of the bar 82 has pivotally mounted on the pin or wire 86 the head or socket 90 of a pawl 91, the body or stem of which extends upwardly and has on its rear face a tooth or point 92 to engage the hundreds-wheel and advance such wheel a single space or number at the completion of each full revolution of the units or tens wheel through the rising and falling movement of the bar 82 from the turning of the plug 24 of the controlling-valve in supplying oil or liquid to and discharging oil or liquid from the measuring vessel. The pawl or dog 91 in line with the point or tooth 92 has an outwardly-projecting ear 93 with a rib 94 on its rear face, between which rib and the body of the pawl or dog is a recess 95, which operates as hereinafter described.

The units or tens wheel has a series of pins or cross-wires 96, secured at one end in an annular flange 97 and at the other end in the body of the wheel. The annular flange is formed with a hub or center 98, having an extension 99, through which passes a locking-screw 100, the end of which engages the face of a shaft 101 and locks the hub firmly to the shaft, the ends of the shaft being supported in the holes 62 therefor in the side walls or plates 56 of the main casing.

The hub or center 98 has formed therewith or fixedly secured thereto the registering-wheel 102 for the units, and the periphery of this wheel is provided with a plurality of flat faces 103, on which numerals from "0" to "95" are consecutively arranged in series of fives, so that each advance of the registering-wheel will indicate a withdrawal of five gallons or such other number of gallons as the periphery of the wheel may be arranged to indicate for each step forward.

The hundreds-wheel has a series of pins 104, one end of which is secured an in annular flange 105 on a hub or center 106, which is mounted on a bearing 107, extending out from the center or hub of the units-wheel, as shown in Fig. 8. The hundreds registering-wheel 108 is formed with or suitably secured to the center or hub 106, and its periphery is provided with flat faces 109, each face having thereon a numeral, with the numerals extending from "0" to "19," consecutively. The pawl or dog 91 has the rib 94 of the side lug or ear 93 arranged to enter a notch 110 in the edge of a disk 111 when the disk is in position for the rib 94 to enter the slot or recess 110 therein. The disk or plate 111 is formed with or secured to a hub or center 112, through which passes a set-screw 113, by which the hub or center is firmly locked to the shaft 101 and revolves with such shaft as the units registering-wheel is advanced, while the hundreds-wheel remains stationary until the disk or plate 111 has been carried once around and the notch or recess 110 is brought into position for the flange 94 to drop thereinto, so that the edge of the flange 105 enters the recess or slot 95, allowing the point or tooth 92 to advance and engage a cross pin or wire 104, so that with the next advance of the units-wheel both pawls 88 and 91 will become active and the two registering-wheels will be advanced, simultaneously bringing the "1" into view on the hundreds-wheel and the "5" into view on the units-wheel, showing that one hundred and five gallons or other measured quantity of oil or liquid has been withdrawn from the tank. The next advance of the units-wheel revolves the shaft 101, and with it the disk or plate 111, carrying the notch 110 therein out of engagement with the lip or ear of the pawl or dog 91, so that the flange 94 rides on the periphery of the disk or plate 111, maintaining the dog or pawl 91 out of its engaging position until the units-wheel has made another complete revolution, when the notch 110 is again brought into position to allow the pawl or dog 91 to drop into engaging position and operate the hundreds-wheel with the next full throw of the dogs or pawls 88 and 91 from the turning of the controlling-valve for the measuring vessel. It will thus be seen that the units-wheel is advanced one notch or space with each filling and emptying of a measuring vessel and that when twenty notches or spaces have been advanced the next advance of the units-wheel will also advance the hundreds-wheel, and this operation will continue until the hundreds-wheel has been advanced to its full capacity, at which time the supply-tank for the oil or liquid is exhausted, or nearly so. It will be understood that the registering-wheels can be arranged to register more than two thousand, if so desired, but for ordinary and general use a two-thousand registration will be all that is required or necessary.

A shaft or rod 114 is fixed at its ends in the side walls 56 of the main casing and is located so as to be at the rear of the casing and above the bottom thereof, as shown in Fig. 7. This rod or wire 114 has mounted thereon the head or socket 115 of a pawl or dog 116, having an engaging tooth or point 117 to engage cross-pins of the registering-wheels, a dog or pawl 116 with a tooth 117 being provided for each registering-wheel. Each stop dog or pawl 116 is connected with its acting dog or pawl by a coiled spring 118, one end 119 of which is hooked into a notch 120 in the acting pawl and the other end 121 of which is hooked into a notch 122 of the stop-pawl, so that with the withdrawal of the acting pawl from its engaging position the spring will draw the stop-pawl into engaging position, and with the forcing of the stop-pawl out of engaging position the acting pawl will be drawn into engaging position, the two pawls thus operating alternately as regards their engaged and disengaged position with the registering-wheel. It will thus be seen that when the acting pawls are moved upwardly into an engaging position the stop-pawls are brought into an engaging position, preventing the backward movement of the registering-wheel with the upward movement of the acting pawl, thus holding the registering-wheels against any back motion and insuring a constant forward motion therefor.

A lug or ear 123 is formed on the inside of one of the side walls 56 of the main casing, and this lug or ear carries a pin or pivot 124, on which is mounted the end 125 of a pawl or dog 126, having a point or tooth 127 so arranged as to enter a notch 128 in the hundreds-wheel and when entered prevent any forward movement of either of the registering-wheels until the point 127 is released from its engagement with the notch 128, thus preventing any tampering with the double register after the full number of registers of the wheels have been made.

The pawl or dog 126 is drawn forward by a spring 129, one end of which is connected with a pin 130 on the upper end of the dog or pawl 126 and the other end of which is connected with a pin or stud 131 on the partition-plate 74 in the arrangement shown. This locking-dog 126 only comes into use after the registering-wheels have made their full registration, and the office of the dog or pawl is to prevent the driver or distributer of the oil or liquid from emptying the tank and then proceeding to operate the registering-wheels, showing a less amount of oil or liquid withdrawn than was actually the case. The dog or pawl 126 after its engagement with the notch 128 locks both of the registering-wheels against forward movement, and the lock continues until the official or proper person opens the front of the casing and releases the point or tooth 127 from the notch 128 and advances the hundreds-wheel slightly, so that the point or tooth 127 will rest against the face of the registering-wheel, when both registering-wheels can be advanced, as hereinbefore described.

A guard against operating the controlling-valve and the registering mechanism after the tank-wagon has returned to the source of supply is furnished by a head or socket 132, having a square hole 133 to slip onto the squared end of the stem 25 of the valve-plug, so as to prevent the entering of a turn-key or other device onto the square end of the stem for turning the valve-plug. This head or socket 132 is formed with an arm 134, having an end 135, which when the socket is on the stem abuts against the face of the end 18 of the measuring vessel 17, and to place the socket or head and its arm or bar in position the cover of the casing is released and partly opened, as shown in Fig. 10, and when the bar or arm is in place the cover is closed once more for the ends of plates 136 on the side wall of the cover to overlap the edge of the end 135 of the locking arm or bar and hold the locking arm or bar with the head or socket 132 in position, thereby preventing any tampering with the registration by turning the valve-plug.

The top wall 57 of the main casing has an upwardly-extending flange 137 and the adjoining wall 63 of the cover has an extension 138, which when the cover is closed lies adjacent to the flange 137, and the flange 137 has therein a hole 139 and the extension or flange 138 has therein a hole 140, which holes 139 and 140 are in alinement when the cover is fully closed. Each of the casings for the registering mechanisms has the flanges 137 and 138, and when both covers are closed a rod 141 is passed through the holes of the flanges, interlocking the cover with its casing. The rod at one end has a head 141$^a$ and its other end has passed therethrough the hasp 142 of a padlock 143, so that after the registering-wheels have been set as the tank starts out the proper officer applies the lock 143, which prevents any withdrawal of the rod 141 and maintains the covers of the casings for the registering mechanisms in their closed position until the tank returns to the source of supply and the padlock is unlocked for the rod 141 to be removed and the covers opened for access to the registering-wheels.

The inner and apex end of each measuring vessel 17 is closed by a head 144, having an annular rim 145, to which the body of the measuring vessel is attached by rivets or otherwise, and the rim is connected by spokes or arms 146 with a center or boss 147, extending out from which is a threaded stem 148, receiving a nut 149, by means of which a cross-bar 150 is attached to the stems and connects the two measuring vessels together at their rear or apex ends, as shown in Fig. 13. The cross-bar 150 has a tubular center 151 for the reception of the end of a tube or rod 152, the upper end of which is connected with a T-coupling 153, joining together the sections 154 of a cross tube or rod. The cross tube or rod 154 at each end has an abutment or stop 155, and surrounding the body of the cross tube or rod at each end is an eyebolt 156, the stem 157 of which extends up through a cross-piece attached to the side beams or pieces of the wagon-body, to which cross-piece the stems are secured by nuts 158 or otherwise, so that the rear or apex ends of the measuring vessels will have a firm and strong support from the wagon-body, which will prevent their side swing and displacement from the travel of the tank-wagon in going from place to place. A diagonal brace 159 extends from the cross-bar 150 at each end and is attached by a bolt or otherwise to the side rail or piece 160 of the frame of the wagon-body, and a brace 161, attached at one end by a bolt or otherwise to the side piece 160, extends down and is attached to an ear or lug 162, formed on the front head of the measuring vessel or on the wall or shell of the controlling-valve, and these diagonal braces 159 and 161 serve to hold the measuring vessel and the parts connected therewith against end thrust or movement in the travel of the tank over pavements and roadways. It will thus be seen that by means of the cross-bar 150 and its connection with the wagon-body and by the braces 159 and 161 each measuring vessel is firmly and securely held in place and is not liable to be shaken or displaced in use. A bar 163 is secured by bolts 164 to the end of the tank, and this bar at each end has a socket 165, through which passes the vent-tube 39, and on the vent-tube above each socket 165 is a coupling or lock-nut 166, which in connection with the bar 163 and its sockets 165 and the vent-tubes 139 furnish a support for the forward or base end of the measuring vessel by which such end will be held against downward dropping or displacement in use.

A bracket-plate 167 projects forwardly from the head 18 of each measuring vessel, and this bracket-plate has an ear 168 at its forward end through which is a hole 169 for the passage of the supply-pipes 36, as shown in Figs. 1, 10, and 13, connecting the supply-pipes with the measuring vesesl so that the supply-pipes are held against lateral swing or play.

A plate 170 is attached at its ends to the supply-pipes 36 in the arrangement shown, and this plate has on its front face numbered spaces from "1" to "20," both inclusive. A sliding guide or marker 171 is movable on the plate 170, and by means of this slide or marker 171 the driver or distributer of the oil or liquid can keep tally of the number of buckets or pails he has delivered to a customer. The movements of the slide or marker 171 to occupy the space "1" on the tally-plate 170 indicates that the driver or distributer has delivered two pails or buckets of five gallons each, making a total of ten gallons, and when the space "5" on the tally plate or bar is covered by the slide or marker the driver or distributer knows that he has delivered fifty gallons to a customer—that is, he has made five trips with two buckets, each bucket containing five gallons. The buckets or pails 172 have a bail 173, which can be hooked over the point 22 and attach the bucket or pail in position below the discharge-nozzle 34 for the oil to flow into the bucket or pail from the measuring vessel when the controlling valve-plug is properly turned.

The operation is as follows: The tank 1 is filled with the oil or liquid to its full capacity of gallons. The registering-wheels for the tens and hundreds are set at zero at the place of supply, and the covers of the casings are closed and locked against opening by the retaining-bar 141 and the hasp-lock 143 or otherwise, so that access cannot be had to the registering-wheels by the driver or distributer of the oil or liquid, and before closing and locking the registering-wheels the lock pawl or dog 126 has its point or tooth 127 released from the notch 128 and the hundreds-wheel advanced for the point or tooth to lie on the face of the wheel. The register-wheels for the tens and hundreds are both set at zero, and the shut-off cock 38 can be turned to supply oil or liquid to both measuring vessels or to only one measuring vessel. The driver or distributer when required to make a delivery hangs a bucket or pail on each of the hooks 22, if both measuring-wheels are in use. The plug 24 of the controlling-valve for each measuring vessel is turned to furnish communication between the passages 29 and 31 through the passage 28 for the oil or liquid to flow into the measuring vessel, and as the oil or liquid enters the measuring vessel the air is forced therefrom through the vent-pipe 39, and with the rise of the oil in the measuring vessel the float 41 rises until the measuring vessel is full, which is indicated by the position of the sights or indicating-balls 42 at the upper end of the float-rods. The plug of the controlling-valve after a measuring vessel is full is turned to furnish communication with the passage 31 and the passage 33 through the passage 28, permitting the oil to outflow from the measuring vessel into the bucket or pail for the quantity of oil in the measuring vessel to fill the bucket or pail, and when filling the bucket or pail the supply of oil from the tank is shut off by the plug of the controlling-valve and with the supply of oil from the tank to the measuring vessel the discharge o oil from the measuring vessel is shut off by the plug of the controlling-valve. The turning of the plug of the controlling valve into the filling position for the supply of oil to flow into the measuring vessel causes the cam 52 to act on the pin 49 and raise the plate 45, and such upward movement of the plate 45 through the stem 80 raises the bar 82, and with it the acting pawls or dogs 88 and 91, for the pawls to assume the position where the point or tooth 89 of the pawl or dog 88 will engage a cross bar or wire 96 of the units-registering wheel, but with the point or tooth of the dog or pawl 91 held out of engagement with the cross bar or wire of its registering-wheel until the units-wheel has made a full revolution, as already described. The turning of the plug of the controlling valve to open communication between the measuring vessel and the bucket or pail through the cam 52 and pin 50 carries down the plate 45, and such downward movement of the plate 45 through the stem 80 and bar 82 moves down the pawls or dogs 88 and 91 for the pawl or dog 88 to advance the units-registering wheel one notch or space, the first downward movement of the dog or pawl 88 bringing the numeral "5" into position before the sight opening in the front of the cases, and with the completion of a full revolution of the units-registering wheel the hundreds-wheel at the next advance of the units-wheel will be advanced one notch or space, bringing into view the numerals 105 for inspection through the sight-opening of the front of the casing, showing that one hundred and five gallons have been taken out of the supply-tank. It will thus be seen that each opening of the controlling-valve to allow oil or liquid to flow into the measuring vessel raises the pawls or dogs into acting position and that each opening of the controlling-valve to discharge oil or liquid from the measuring vessel forces the dogs or pawls down for the downward movement to operate and advance the registering-wheels, so that it is impossible to fill the measuring vessel and discharge said vessel without at the same time operating the registering mechanism, thus making it impossible to deliver the oil or liquid without making a registration of the number of gallons delivered.

The driver or distributer can keep a record of the number of gallons delivered by the tally plate or bar and its slide or marker, so as to be sure that the full number of gallons have been delivered. The registration of each delivery will continue until the supply-tank is emptied, and each delivery of a bucket or pail will be duly and properly registered, and when emptied the condition of the registering-wheels indicates the number of gallons of oil or liquid that have been taken from the tank, which is also the case in the event of the tank not being emptied, as the registering-wheels will show the precise number of gallons taken from the tank by the driver or distributer. The locking pawl or dog 126 prevents any forward movement of the registering-wheels after the full registry of the wheels has been completed, and with the return of the tank-wagon to the source of supply the locking-bar 134 when applied prevents any tampering with the registering-wheels by unauthorized persons, thus insuring a correct registration of the number of gallons withdrawn from the supply-tank. The registering mechanism when once set at the place of supply and the tank-wagon started out on its trip cannot be manipulated by the driver or distributer, as the casing in which the registering mechanism is located is locked by the cover and the engaging lugs and tie-rod with the hasp-lock and remains in its closed position until the wagon returns from the trip, and with the return of the wagon by applying the locking-bar 134 to the stem of the plug of the controlling-valve any changing of the register will be prevented.

The measuring vessels and the parts connected therewith are firmly and securely supported from the wagon-body, so as to be held against displacement or swing in ordinary use, and by having the body of each measuring vessel located underneath the rear end of the supply-tank it is practically impossible to injure or impair the efficiency and operation of the measuring vessels and the registering mechanism. The tapered form of the measuring vessels and withdrawing the oil or liquid therefrom at the lowest point in front insures the withdrawal of the entire amount of oil or liquid with each operation of the controlling-valve, and inasmuch as the turning of the controlling-valve actuates the registering mechanism it will be seen that the filling and emptying of the carrying bucket or pail is registered each and every time the bucket or pail is filled and emptied.

The locating of the measuring vessels beneath the rear end of the tank-wagon brings the rear or base end of each vessel in a plane projecting beyond the end of the tank, so that the vent-tubes 39 can be extended upwardly in a straight line and the rods 40 allowed to rise and fall vertically without any liability of sticking in the tube, and in addition the vent-tubes through the cross-bar on the end of the tank hold the rear or base end of the measuring vessel against downward drop. It is the intention to employ two measuring vessels on the tank-wagon, each measuring vessel having its own independent controlling-valve and registering mechanism, each registering mechanism having its registering-wheels arranged to indicate two thousand gallons, giving four thousand gallons as the total register of the two mechanisms, and by having each registering vessel provided with its individual controlling-valve and registering mechanism enables the driver or distributer to use two delivery buckets or pails at each carry or only one delivery bucket or pail, as may be required or necessary. The movement of the cross-bar 82 is such that at the terminus, or nearly so, of the upward movement of the plate 45 the point or tooth of the pawl or dog will be forced forward by the spring, so as to overlie the rod of the registering-wheel, and the location of the passage in the plug of the valve is such as to cause a movement of the registering-wheel forwardly before the passage in the valve-plug comes into communication with the passage from the measuring vessel and the passage in the discharge-nozzle, thus making a positive advance of the registering-wheel before the oil or liquid commences to flow, and with the initial advance of the registering-wheel the locking-pawl at the rear of such wheel is drawn by the spring into position where its point or tooth will engage the cross-rod of the registering-wheel, preventing any backward movement of the wheel and making it a necessity to carry the acting pawl downward to its full limit before the locking-pawl will be released, thus insuring a registration which must be completed in order to release the registering-wheel, thereby rendering it impossible to partially advance the registering-wheel and then return the acting pawl to engaging position, and thereby skip a registration, as the register must be made complete before the locking-pawl can be released from its engagement with the registering-wheel.

While the measuring vessels or vessel, the controlling-valve therefor, and the registering mechanism are shown in connection with a tank-wagon, it is to be understood that these devices are intended for use and can be used in connection with a storage-tank, a pipe-line, or other source of supply for the oil or liquid for delivering or transferring the oil or liquid either to a peddler or other purchaser of or dealer in the liquid or oil, and when soused the measuring vessels, the controlling-valve, and the registering mechanism operate as hereinbefore described.

What I claim as new, and desire to secure by Letters Patent, is—

1. In a delivery-tank for liquids, the combination of a tank for containing the liquid, a measuring vessel for receiving thereinto and delivering therefrom a predetermined quantity of liquid, a valve having a plug controlling the inlet and outlet for the measuring vessel, an operating-stem for the valve-plug, a cam on the operating-stem, a movable plate raised and lowered by the cam, a supporting-bar connected with the movable plate, an acting pawl carried by the bar, a registering-wheel advanced by the pawl with each complete turning of the valve-plug to fill and discharge the measuring vessel, and a stop-pawl for preventing backward movement of the registering-wheel, substantially as described.

2. In a delivery-tank for liquids, the combination of a tank for containing the liquid, a measuring vessel for receiving thereinto and delivering therefrom a predetermined quantity of liquid, a valve having a plug controlling the inlet and outlet for the measuring vessel, an operating-stem for the valve-plug, a cam on the operating-stem, a movable plate having a slot in line with the valve-plug, an upper pin and a lower pin inwardly projecting from the plate and engaged by the cam on the stem of the valve-plug for raising and lowering the plate, a supporting-bar connected with the movable plate, an acting pawl carried by the bar and a registering-wheel advanced by the pawl with each complete turning of the valve-plug to fill and discharge the measuring vessel, substantially as described.

3. In a delivery-tank for liquids, the combination of a tank for containing the liquid, a measuring vessel for receiving thereinto and delivering therefrom a predetermined quantity of liquid, a valve having a plug controlling the inlet and outlet for the measuring vessel, an operating-stem for the valve-plug, a cam on the operating-stem, a movable plate having a slot in line with the valve-plug, an upper pin and a lower pin inwardly projecting from the plate and engaged by the cam on the stem of the valve-plug for raising and lowering the plate, a supporting-bar connected with the movable plate, an acting pawl carried by the bar, a registering-wheel advanced by the pawl with each complete turning of the valve-plug to fill and discharge the measuring vessel, and a stop-pawl engaging with and preventing backward movement of the registering-wheel, substantially as described.

4. In a delivery-tank for liquids, the combination of a tank for containing the liquid, a measuring vessel for receiving thereinto and delivering therefrom a predetermined quantity of liquid, a valve having a shell with an inlet in communication with the delivery-tank and an outlet in communication with the measuring vessel, a plug in the casing of the valve and having therein a cross-passage of a less capacity than the passages in the casing for choking the communication with the measuring vessel, a stop on the valve-plug, an operating-stem for the valve-plug, a cam on the operating-stem, a movable plate raised and lowered by the cam, a supporting-bar connected with the movable plate, an acting pawl carried by the bar, and a registering-wheel advanced by the pawl with each complete turning of the valve-plug to fill and discharge the measuring vessel, substantially as described.

5. In a delivery-tank for liquids, the combination of a tank for containing the liquid, a measuring vessel for receiving thereinto and delivering therefrom a predetermined quantity of liquid, a valve having a shell with an inlet in communication with the delivery-tank and an outlet in communication with the measuring vessel, a plug in the casing of the valve and having therein a cross-passage of a less capacity than the passages in the casing for choking the communication with the measuring vessel, a stop on the valve-plug, an operating-stem for the valve-plug, a cam on the operating-stem, a movable plate raised and lowered by the cam, a supporting-bar connected with the movable plate, an acting pawl carried by the bar, a registering-wheel advanced by the pawl with each complete turning of the valve-plug to fill and discharge the measuring vessel, and a stop-pawl arranged to engage the registering-wheel with the initial advance of the wheel by the acting-pawl and thereby prevent a backward movement of the registering-wheel, substantially as described.

6. In a delivery-tank for liquids, the combination of a tank for containing the liquid, a measuring vessel for receiving thereinto and delivering therefrom a predetermined quantity of liquid, the measuring vessel having a tapered body with the base end outward and the body of the vessel extending underneath the rear end of the supply-tank, a controlling-valve between the delivery-tank and the measuring vessel, and a registering mechanism attached to the outer end head of the measuring vessel and actuated by the turning of the valve-plug and creating a register each time the measuring vessel is filled and emptied, substantially as described.

7. In a delivery-tank for liquids, the combination of a tank for containing the liquid, a measuring vessel for receiving thereinto and delivering therefrom a predetermined quantity of liquid, the measuring vessel having a tapered body with the base end outward and the body of the vessel extending underneath the rear end of the supply-tank, a discharge-pipe entered into the lowermost point of the base end of the measuring vessel, a controlling-valve in communication with the discharge-pipe of the measuring vessel and with the liquid-tank, and a registering mechanism carried by the head at the base end of the measuring vessel and actuated by the turning of the plug of the controlling-valve to complete a register at each filling and emptying of the measuring vessel, substantially as described.

8. In a delivery-tank for liquids, the combination of a measuring vessel, a closing-head for the rear end of the measuring vessel, an exterior wall on the head and inclosing a chamber in communication through an opening in the head with the interior of the measuring vessel, and a vent-tube entered into the upper end of the wall and in communication with the chamber inclosed by the wall, substantially as described.

9. In a delivery-tank for liquids, the combination of a measuring vessel, a closing-head for the rear end of the measuring vessel, an exterior wall on the head in communication through an opening in the head with the interior of the measuring vessel and inclosing a chamber, a vent-tube entering into the top of the wall and in communication with the chamber inclosed by the wall, a rod in the vent-tube, a float on the end of the rod and movable within the chamber, and a ball at the upper end of the rod, substantially as described.

10. In a delivery-tank for liquids, the combination of a measuring vessel having a head at its rear end, a casing attached to the head and having side walls, a top wall and a front wall, a cover for the casing having a front wall and side walls, a controlling-valve for the measuring vessel, a supporting-bar having a rising-and-falling movement in the casing and actuated from the controlling-valve for the measuring vessel, a pawl carried by the bar, and a registering-wheel advanced by the pawl with each complete rise and fall of the bar, substantially as described.

11. In a delivery-tank for liquids, the combination of a measuring vessel having a head at its rear end, a casing attached to the head and having side walls, a top wall and a front wall, a cover for the casing having a front wall and side walls, a controlling-valve for the measuring vessel a supporting-bar having a rising-and-falling movement in the casing and actuated from the controlling-valve for the measuring vessel, a pair of pawls carried by the supporting-bar, one pawl acting on a units-wheel and the other pawl acting on the hundreds-wheel of a register, for advancing the registering-wheels one step at a time with each complete rise and fall of the supporting-bar, substantially as described.

12. In a delivery-tank for liquids, the combination of a measuring vessel having a head at its rear end, a casing attached to the head and having side walls, a top wall and a front wall, a cover for the casing having a front wall and side walls, a controlling-valve for the measuring vessel, a supporting-bar having a rising-and-falling movement in the casing and actuated from the controlling-valve for the measuring vessel, a pawl carried by the bar, a registering-wheel advanced by the pawl with each complete rise and fall of the bar, and a stop-pawl mounted in the casing and arranged to engage the registering-wheel and prevent backward turning of the pawl, substantially as described.

13. In a delivery-tank for liquids, the combination of a measuring vessel having a head at its rear end, a casing attached to the head and having side walls, a top wall and a front wall, a cover for the casing having a front wall and side walls, a controlling-valve for the measuring vessel, a supporting-bar having a rising-and-falling movement in the casing and actuated from the controlling-valve for the measuring vessel, a pair of pawls carried by the supporting-bar, one pawl acting on a units-wheel and the other pawl acting on the hundreds-wheel of a register, for advancing the registering-wheels one step at a time with each complete rise and fall of the supporting-bar, and a locking-pawl for each registering-wheel, each pawl arranged to engage its wheel and prevent backward turning thereof, substantially as described.

14. In a delivery-tank for liquids, the combination of a measuring vessel, a head for the base end of the registering vessel, a casing attached to the head and consisting of side walls, a top wall and a bottom wall, a cover for the casing consisting of a front wall and side walls, a controlling-valve for the measuring vessel, a supporting-bar having a rising-and-falling movement given thereto by the controlling-valve for the measuring vessel, a pair of pawls carried by the supporting-bar, a registering-wheel for each pawl, a shaft supporting the registering-wheels, and stop-pawls, one for each registering-wheel, substantially as described.

15. In a delivery-tank for liquids, the combination of a measuring vessel, a head for the base end of the registering vessel, a casing attached to the head and consisting of side walls, a top wall and a bottom wall, a cover for the casing consisting of a front wall and side walls, a controlling-valve for the measuring vessel, a supporting-bar having a rising-and-falling movement given thereto by the controlling-valve for the measuring vessel, a pair of pawls carried by the supporting-bar, a registering-wheel for each pawl, a shaft supporting the registering-wheels, stop-pawls, one for each registering-wheel, and a locking-pawl mounted in the casing and engaging with one of the registering-wheels and preventing further movement of the registering-wheels, substantially as described.

16. In a delivery-tank for liquids, the combination of a measuring vessel, a head for the base end of the measuring vessel, a casing attached to the head and consisting of side walls, a top wall and a bottom wall, a cover for the casing consisting of a front wall and side walls, a flange on the top wall of the casing, a flange on one side wall of the cover, a locking-bar passing through the flanges, and means for preventing withdrawal of the locking-bar, substantially as described.

17. In a delivery-tank for liquids, the combination of a tank for containing the liquid, a pair of measuring vessels each receiving thereinto and delivering therefrom a predetermined quantity of liquid, a pair of valves one valve for each measuring vessel and each valve having a plug controlling the inlet and outlet for its measuring vessel, an operating-stem for each valve-plug, a cam on each operating-stem, a movable plate for each operating-stem raised and lowered by the cam, a supporting-bar connected with each movable plate, an acting pawl carried by each supporting-bar, and a registering-wheel advanced by each acting pawl with a complete turning of the valve-plug to fill and discharge a measuring vessel, substantially as described.

18. In a delivery-tank for liquids, the combination of a tank for containing the liquid, a pair of measuring vessels each receiving thereinto and delivering therefrom a predetermined quantity of liquid, a pair of valves, one valve for each measuring vessel and each valve having a plug controlling the inlet and outlet for its measuring vessel, an operating-stem for each valve-plug, a cam on each operating-stem, a movable plate for each operating-stem raised and lowered by the cam, a supporting-bar connected with each movable plate, an acting pawl carried by each supporting-bar, a registering-wheel advanced by each acting pawl with a complete turning of the valve-plug to fill and discharge a measuring vessel, and a stop-pawl for preventing backward movement of the registering-wheel, substantially as described.

19. In a delivery-tank for liquids, the combination of a tank for containing the liquid, a pair of measuring vessels each vessel receiving thereinto and delivering therefrom a predetermined quantity of liquid, a valve for each measuring vessel, each valve having a shell with an inlet in communication with the delivery-tank and an outlet in communication with the measuring vessel, a plug in the casing of each valve, the plug having therein a cross-passage of less capacity than the passages in the casing for choking the communication with the measuring vessel, an operating-stem for each valve-plug, a cam on each operating-stem, a movable plate raised and lowered by each cam, a supporting-bar for each movable plate and connected with the movable plate, an acting pawl for each supporting-bar, a registering-wheel for each acting pawl advanced by the pawl with each complete turning of the valve-plug to fill and discharge the measuring vessel, and a stop-pawl arranged to engage each registering-wheel with the initial advance of the wheel by the acting pawl and thereby prevent backward movement of the registering-wheel, substantially as described.

20. In a delivery-tank for liquids, the combination of a tank for containing the liquid, a pair of measuring vessels each vessel receiving thereinto and delivering therefrom a predetermined quantity of liquid, and each measuring vessel having a tapered body with the base end outward and the body of the vessel extending underneath the rear end of the supply-tank, a controlling valve between the delivery-tank and each measuring vessel and a registering mechanism attached to the outer head of each measuring vessel and actuated by the turning of the valve-plug to create a register each time the measuring vessel is filled and emptied, substantially as described.

21. In a delivery-tank for liquids, the combination of a measuring vessel having a head at its rear end, a controlling-valve for the measuring vessel, a casing attached to the head, a supporting-bar having a rising-and-falling movement in the casing and actuated from the controlling-valve for the measuring vessel, a pair of pawls carried by the supporting-bar, one pawl acting on a units-wheel and the other pawl acting on the hundreds-wheel of a register, a tens-wheel for a register consisting of a flange, a hub and a numbered disk, a hundreds-wheel for a register consisting of a flange, a hub and a numbered disk, cross-pins for each register-wheel, a disk having a notch in its periphery and a hub, and a shaft having the hub of the tens-wheel fixedly secured thereto and having the hub of the notched disk fixedly secured thereto, whereby the movements of the pawls will advance the units registering-wheel one step at a time and with the completion of the advance operate to advance the hundreds-wheel one step, each advance of the tens registering-wheel occurring with each complete rise and fall of the supporting-bar, substantially as described.

22. In a delivery-tank for liquids, the combination of a supply-tank for liquid, a measuring vessel located at the rear end of and underneath the tank, a pipe leading from the supply-tank to a controlling-valve, a controlling-valve interposed between the supply-pipe and the measuring vessel, a plug for the controlling-valve having a stem with a cam thereon, a rising and falling plate actuated by the cam on the stem, a supporting-bar actuated by the rising and falling plate, and a registering mechanism operated from the supporting-bar with the bars arranged for the flow of liquid from the supply-tank to the measuring vessel to be cut off before the cam operates the register and before the flow from the measuring vessel to the discharge is established, substantially as described.

23. In a delivery-tank for liquids, the combination of a supply-tank, a measuring vessel at the rear end of the supply-tank, a pipe leading from the supply-tank to a controlling-valve, a controlling-valve interposed between the supply-pipe and the measuring vessel, a plug for the controlling-valve, a rising and falling plate actuated from turning the plug, a register operated from the movements of the rising and falling plate with the valve-plug having its connecting-passage arranged with respect to the register that the flow of liquid from the supply-tank to the measuring vessel will be cut off before the plug operates the register and before the flow from the measuring vessel for discharge is established, substantially as described.

24. In a delivery-tank for liquids, the combination of a tank-wagon framework, a supply-tank, a pair of measuring vessels located at the rear end of and beneath the supply-tank, a front head for each measuring vessel, each front head having a stem, a cross-bar connecting the stems of the heads, a vertical bar from the cross-bar, a cross-bar at the upper end of the vertical bar, and means for attaching the upper cross-bar to the framework of the tank-wagon, substantially as described.

25. In a delivery-tank for liquids, the combination of a tank-wagon framework, a supply-tank, a pair of measuring vessels located at the rear end of and beneath the supply-tank, a front head for each measuring vessel each front head having a stem, a cross-bar connecting the stems of the heads, a vertical bar from the cross-bar, a cross-bar at the upper end of the vertical bar, and eyebolts for attaching the upper cross-bar to the framework of the tank-wagon, substantially as described.

26. In a delivery-tank for liquids, the combination of a supply-tank, measuring vessels at the rear end of and extending beneath the supply-tank, a head for the base end of each of the measuring vessels, a wall on the head, a support entered into the wall on the head, a cross-bar attached to the head of the tank and through the ends of which the supports pass, and means for engaging each support with the cross-bar on the upper side of the cross-bar, substantially as described.

27. In a delivery-tank for liquids, the combination of a tank for containing the liquid, a fixed measuring vessel having communication with the tank for receiving thereinto and delivering therefrom a predetermined quantity of liquid, a valve having a plug controlling the inlet and outlet for the measuring vessel, an operating-stem for the valve-plug, a cam on the operating stem, a plate bodily movable and vertically raised and lowered by the cam, a supporting-bar connected with and bodily raised and lowered by the rising-and-falling movement of the movable stem, an actuating-pawl having a lateral yield and carried by the bar, and a registering-wheel advanced by the pawl with each complete turning of the valve-plug to fill and discharge the measuring vessel, substantially as described.

28. In a delivery-tank for liquids, the combination of a tank for containing the liquid, a measuring vessel receiving thereinto and delivering therefrom a predetermined quantity of liquid and having communication with the tank, a valve consisting of a shell and a plug in the shell, the shell having a vertical passage in communication with the delivery-tank, a horizontal passage in communication with the measuring vessel, and a vertical discharge-passage and having the horizontal passage common to both vertical passages, and the plug having a single curved cross-passage of a less capacity than the vertical and horizontal passages in the shell for choking the inflow and outflow of the liquid into and from the measuring vessel, a peripheral stop on the end of the valve-plug, and an upper and lower stop on the end of the valve-shell for limiting the turning of the valve-plug into its eduction and induction position, and a registering mechanism only actuated by turning the valve-plug in both directions to its full limit, substantially as described.

29. In a delivery-tank for liquids, the combination of a tank for containing the liquid, a pair of measuring vessels each vessel having a fixed relation to and having communication with the tank for each vessel to receive thereinto and deliver therefrom a predetermined quantity of liquid, a valve for each measuring vessel, each valve consisting of a shell and a plug in the shell, the shell having a vertical passage in communication with the delivery-tank, a horizontal passage in communication with its measuring vessel, and a vertical discharge-passage and having the horizontal passage common to both vertical passages, and the plug having a single curved cross-passage of less capacity than the vertical and horizontal passages in the shell for choking the inflow and outflow of the liquid into and from the measuring vessel, a peripheral stop on the end of each valve-plug, an upper and lower stop on the end of the shell of each valve for limiting the turning of the valve into its eduction and induction positions, and a registering mechanism for each measuring vessel, each registering mechanism only actuated by turning the valve-plug of its measuring vessel to its full limit in both directions, substantially as described.

EDWIN A. GILES.

Witnesses:
OSCAR W. BOND,
WALKER BANNING.